United States Patent
Huck et al.

(10) Patent No.: US 11,194,051 B2
(45) Date of Patent: Dec. 7, 2021

(54) METHOD AND APPARATUS FOR PROVIDING INTEGRITY INFORMATION FOR CHECKING ATMOSPHERIC CORRECTION PARAMETERS FOR CORRECTING ATMOSPHERIC DISTURBANCES FOR SATELLITE NAVIGATION FOR A VEHICLE

(71) Applicant: Robert Bosch GmbH, Stuttgart (DE)

(72) Inventors: Bastian Huck, Hannover (DE); Marco Limberger, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 412 days.

(21) Appl. No.: 16/272,143

(22) Filed: Feb. 11, 2019

(65) Prior Publication Data

US 2019/0250278 A1    Aug. 15, 2019

(30) Foreign Application Priority Data

Feb. 14, 2018 (DE) .................... 10 2018 202 223.2

(51) Int. Cl.
*G01S 19/08* (2010.01)
*G01S 19/27* (2010.01)
(Continued)

(52) U.S. Cl.
CPC .............. *G01S 19/08* (2013.01); *G01S 19/07* (2013.01); *G01S 19/14* (2013.01); *G01S 19/27* (2013.01);
(Continued)

(58) Field of Classification Search
CPC .......... G01S 19/08; G01S 19/07; G01S 19/27; G01S 19/20; G01S 19/05; G01S 5/0036; G01S 5/0063; G05D 1/0278
(Continued)

(56) References Cited

U.S. PATENT DOCUMENTS

| | | | | |
|---|---|---|---|---|
| 2005/0093739 | A1* | 5/2005 | DiLellio | G01S 19/08 342/357.31 |
| 2005/0234643 | A1* | 10/2005 | Abraham | G01S 19/05 701/469 |

(Continued)

OTHER PUBLICATIONS

Berdermann, J. et al., Ionosphere Monitoring and Prediction Center (IMPC), Proceedings of the 27th International Technical Meeting of the ION Satellite Division, Sep. 8-12, 2014, pp. 14-21, Tampa, FL, USA.
(Continued)

*Primary Examiner* — Harry K Liu
(74) *Attorney, Agent, or Firm* — Maginot, Moore & Beck LLP

(57) ABSTRACT

A method for providing integrity information for checking atmospheric correction parameters for the correction of atmospheric disturbances for satellite navigation for a vehicle includes reading state signals relating to a state of an atmosphere between at least one satellite receiver and at least one satellite of the at least one satellite receiver. Each state signal represents certain state data that are transmitted between a satellite and a satellite receiver. The method further includes using at least one satellite signal and that are dependent on a state of the atmosphere between the satellite and the satellite receiver. The method further includes determining the integrity information using the state data. A variation of the state data against time is analyzed.

10 Claims, 6 Drawing Sheets

(51) Int. Cl.
*G05D 1/02* (2020.01)
*G01S 19/14* (2010.01)
*G01S 19/07* (2010.01)

(52) U.S. Cl.
CPC ... *G05D 1/0278* (2013.01); *G05D 2201/0213* (2013.01)

(58) Field of Classification Search
USPC .................................................. 342/357.45
See application file for complete search history.

(56) References Cited

U.S. PATENT DOCUMENTS

2008/0018527 A1* 1/2008 LaMance ................ H04W 4/02
342/357.66
2019/0094371 A1* 3/2019 Biacs ...................... G01S 19/08

OTHER PUBLICATIONS

Colombo, Oscar et al., Extending Wide Area and Virtual Reference Station Networks Far Into the Sea With GPS Buoys, ION GNSS 18th International Technical Meeting of the Satellite Division, Sep. 13-16, 2005, pp. 560-572, Long Beach, CA, USA.

* cited by examiner

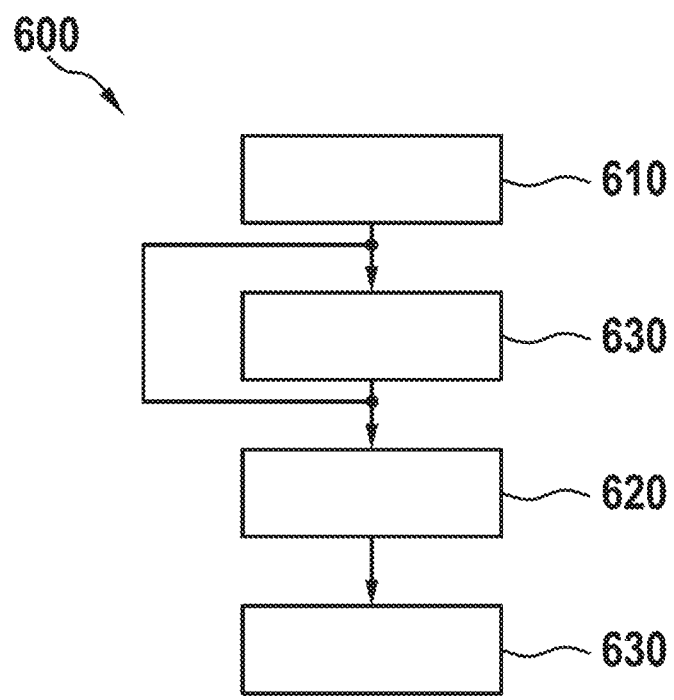

METHOD AND APPARATUS FOR PROVIDING INTEGRITY INFORMATION FOR CHECKING ATMOSPHERIC CORRECTION PARAMETERS FOR CORRECTING ATMOSPHERIC DISTURBANCES FOR SATELLITE NAVIGATION FOR A VEHICLE

This application claims priority under 35 U.S.C. § 119 to patent application no. DE 102018202223.2 filed on Feb. 14, 2018 in Germany, the disclosure of which is incorporated herein by reference in its entirety.

The disclosure is based on an apparatus and a method as disclosed herein. The subject matter of the disclosure is also a computer program.

BACKGROUND

For correcting positioning signals in satellite navigation, for example deviations through the Earth's atmosphere, in particular in the ionosphere, can be taken into account. Inter alia a network of terrestrial measuring stations can be resorted to for this for example. Correction data can be provided using such a network.

SUMMARY

Against this background, with the approach presented here a method, also an apparatus that uses said method, and finally a corresponding computer program according to the disclosure are presented. Owing to the measures mentioned in the disclosure, advantageous developments and improvements of the apparatus specified in the disclosure are possible.

According to embodiments, in particular integrity monitoring of atmospheric correction data, for example ionospheric correction data, can be enabled using gradients or profile information of state data of the atmosphere, which can be derived from the signals transmitted between satellites and satellite receivers. For example, using measurement values, which for example are obtained by means of inexpensive satellite receivers, a four-dimensional electron density model of the atmosphere can thus be obtained, for example against the geographic length, geographic width, height and time, or a three-dimensional model of an integrated electron density (TEC=Total Electron Content or electron density) can be obtained, for example against geographic length, geographic width and time. In this case, in particular a rate of an electron density or a so-called ROT (ROT=rate of TEC), a rate of change of an electron density index or a so-called ROTI (ROTI=rate of change of TEC index) and in addition or alternatively quality indicator values or QI values and the dynamics thereof can be used.

Correction data can be provided in this case using a network of terrestrial measuring stations and at least one geostationary satellite. A transmission can be carried out by means of geostationary satellites, by means of the Internet or a telecommunications network. Terrestrial stations can be used for the calculation of errors. A transmission of error models can be carried out by means of geostationary satellites, the Internet or another communications option.

Advantageously, according to embodiments the rate of the electron density, the rate of change of the electron density index and in addition or alternatively the quality indicator values and the dynamics thereof can therefore be used in order to enable integrity monitoring of correction data provided by correction providers in safety-critical applications, such as for example highly automated driving, or to enable user-based integrity monitoring. In this case, in particular the monitoring of ionospheric corrections can be enabled, for which often no integrity information can be provided by correction services. Thus for example, even in particularly safety-critical applications, correspondingly high integrity requirements can be reliably satisfied.

A method for providing integrity information for checking atmospheric correction parameters for correcting atmospheric disturbances for satellite navigation for a vehicle is presented, wherein the method comprises the following steps:

Reading state signals relating to a state of the atmosphere between at least one satellite receiver and at least one satellite by the at least one satellite receiver, wherein each state signal represents certain state data that are dependent on a state of the atmosphere between a satellite and a satellite receiver using at least one satellite signal transmitted between the satellite and the satellite receiver; and Determining the integrity information using the state data, wherein a variation of the state data against time is analyzed.

This method can be implemented in software or hardware, for example, or in a mixed form of software and hardware for example in a control unit or an apparatus. Satellite navigation can also include locating a vehicle in which a satellite receiver is disposed. The atmospheric disturbances can in particular occur in the Earth's ionosphere. A satellite receiver can be a static reference satellite receiver or a vehicle-borne satellite receiver or a satellite receiver of the vehicle. The satellite receiver can be embodied in order to enable position determination for a user by satellite navigation using at least one satellite signal and in addition or alternatively for a user's equipment. The satellite receiver can be implemented as a two-frequency satellite receiver or a multi-frequency satellite receiver.

According to one embodiment, the step of determining by means of at least one static reference satellite receiver can be implemented by means of a determining device outside the vehicle and in addition or alternatively by means of a satellite receiver of the vehicle. The determining device outside the vehicle can be part of a data processing system of a correction service provider. In particular, the determining device outside the vehicle can be implemented as a so-called server-backend or similar. The determining device outside the vehicle can also be implemented by means of cloud computing. Such an embodiment has the advantage that depending on the prevailing conditions transmission bandwidth and computing power can be saved and usefully allocated.

In the step of determining the integrity information using position information, at least one static reference satellite receiver can also be determined as the source of the state signals. Position information can represent a geographic position of a static reference satellite receiver. The position information can be in the form of coordinate data of a geographic position or in the form of identification data, from which a geographic position can be determined indirectly. Such an embodiment has the advantage that an accurate and reliable overview of a state of the atmosphere at different geographic positions can be obtained.

Furthermore, the method can comprise a step of transmitting the state signals or the integrity information to a satellite receiver of the vehicle. Such an embodiment has the advantage that the use or the use and determination of the integrity information can be carried out in the vehicle. In this case, depending on the application the computing power for the satellite receiver or a vehicle device can be saved and in addition or alternatively the transmission bandwidth can be reduced.

In this case, the transmission step can be carried out depending on in a result of a threshold value decision. In this case, a comparison of the state signals or the integrity information with a threshold value related to the atmospheric disturbances can be carried out for the threshold value decision. An embodiment of this type has the advantage that similarly to filtering only relevant or pertinent state signals or integrity information are processed further or used. Thus, computing power and transmission bandwidth can be reduced.

Here too, in the transmission step state signals of selected static reference satellite receivers or integrity information based on state signals of selected static reference satellite receivers can be transmitted. In this case, the selected static reference satellite receiver can be chosen depending on a geographic position of the satellite receiver of the vehicle. An embodiment of this type has the advantage that computing power and transmission bandwidth can be saved, because only regionally relevant state signals or integrity information are transmitted. A state of the atmosphere in a region of interest can thus also be detected more reliably and more accurately.

According to one embodiment, in the reading step the state signals can be read, the state data of which represent a total electron content as a parameter of the Earth's atmosphere and in addition or alternatively quality indicators of at least one satellite receiver. In this case, the total electron content can be defined as a product of electron density and distance, measured in electrons per square meter. In this case, the quality indicators can comprise standard deviations and in addition or alternatively variances relating to a signal transmission by means of the at least one satellite receiver. In the determination step, a gradient of the total electron content over a specified time interval, a standard deviation of a gradient of the total electron content over a specified time interval and in addition or alternatively a change against time of the quality indicators over a specified time interval can be determined as integrity information. An embodiment of this type has the advantage that reliable and accurate indications of the state of the atmosphere in a local region can be obtained using dynamic state data of this type.

The approach proposed here further provides an apparatus that is embodied to carry out, actuate or implement the steps of a version of a method proposed here in corresponding devices. The problem underlying the disclosure can also be solved rapidly and efficiently by this embodiment of the disclosure in the form of an apparatus.

For this purpose, the apparatus can comprise at least one computing unit for processing signals or data, at least one memory unit for storing signals or data, at least one interface to a sensor or an actuator for reading sensor signals from the sensor or for outputting data signals or control signals to the actuator and/or at least one communications interface for reading or outputting data embedded in a communications protocol. The computing unit can for example be a signal processor, a microcontroller or similar, wherein the memory unit can be a flash memory, an EEPROM or a magnetic memory unit. The communications interface can be embodied in order to read or output data wirelessly and/or by wire, wherein a communications interface that can read or output can read said data for example electrically or optically from a corresponding data transmission line or can output data by wire to a corresponding data transmission line.

In the present case, an apparatus can mean an electrical unit that processes sensor signals and depending thereon outputs control signals and/or data signals. The apparatus can comprise an interface that can be embodied in hardware and/or software. In the case of a hardware implementation, the interfaces can for example be part of a so-called system ASIC containing diverse functions of the apparatus. It is however also possible that the interfaces are dedicated integrated circuits or at least partly consist of discrete components. In the case of a software implementation, the interfaces can be software modules, which for example are provided on a microcontroller in addition to other software modules.

In one advantageous embodiment, the apparatus can be implemented as part of a satellite receiver or a device connected to at least one satellite receiver with signal transmission capability. In particular, the apparatus can be implemented as part of a vehicle, can be disposed within a vehicle and in addition or alternatively can be implemented as part of an equipment forming part of a vehicle. In addition or alternatively, the apparatus can be disposed and implemented outside the vehicle. The apparatus enables a check regarding a correction of a signal transmission between at least one satellite and a satellite receiver for satellite-based navigation. For this purpose, the apparatus can access state signals and satellite signals, for example. The actuation is carried out by means of signal transmission devices such as transmitters, transmitter-receivers and antennas.

A computer program product or a computer program with program code that can be stored on a machine-readable medium or a memory medium such as a semiconductor memory, a hard disk memory or an optical memory and that is used for carrying out, implementing and/or actuating the steps of the method as disclosed, in particular when the program product or program is executed on a computer or an apparatus, is advantageous.

BRIEF DESCRIPTION OF THE DRAWINGS

Exemplary embodiments of the approach proposed here are represented in the drawings and are described in detail in the following description. In the figures:

FIG. 6 shows a flow chart of a providing method according to an exemplary embodiment.

DETAILED DESCRIPTION

Figure 1:
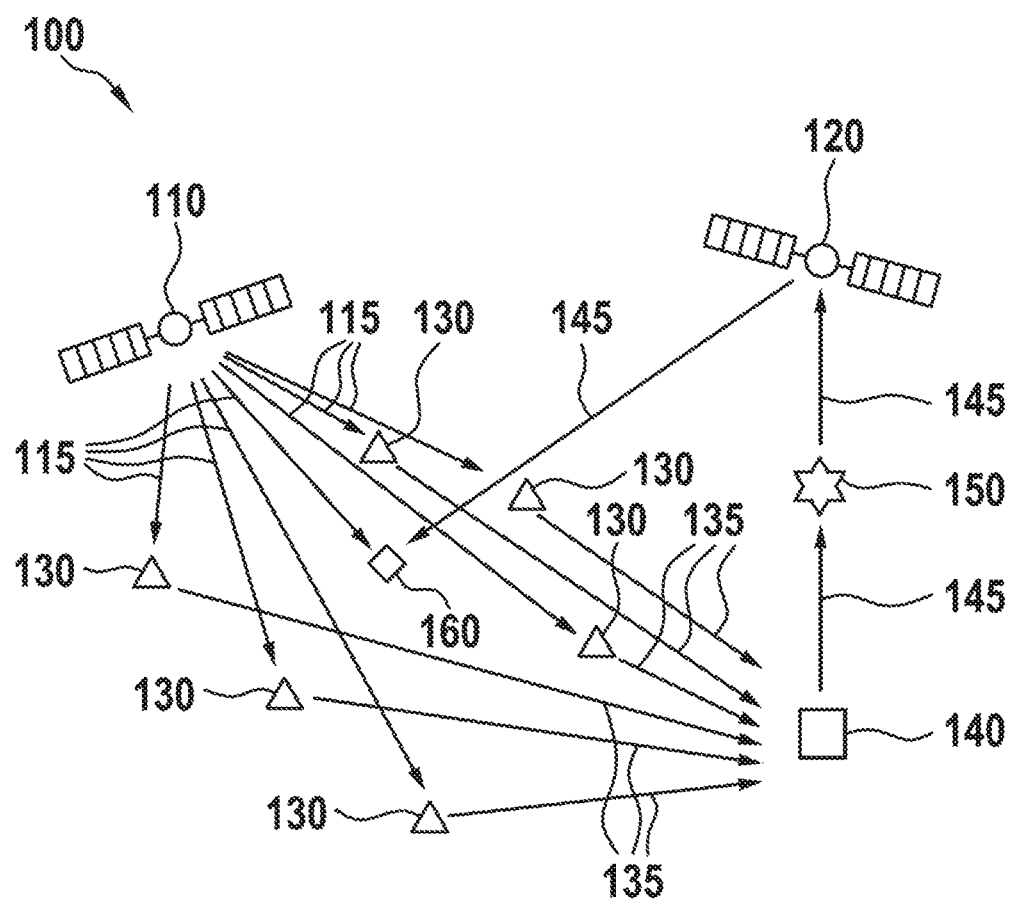
FIG. 1 shows a schematic representation of a Satellite navigation system according to an exemplary embodiment.

In the following description of favorable exemplary embodiments of the disclosure, the same or similar reference characters are used for the similarly acting elements represented in the different figures, wherein a repeated description of said elements is not provided.

FIG. 1 shows a schematic representation of a satellite navigation system 100 according to an exemplary embodiment. According to the exemplary embodiment represented here, the satellite navigation system 100 comprises only by way of example a satellite 110 or a GNSS satellite 110 (GNSS=Global Navigation Satellite System; a global civil satellite navigation system), a geostationary transmission satellite 120, a plurality of GNSS receiving stations 130 or GNSS reference stations 130 or static reference satellite receivers 130 in a station network of a correction data provider, a data processing center 140 or a data processing device 140 of the correction data provider, a transmission station 150 or an uplink station 150 for correction transmission by means of the geostationary transmission satellite 120 and a user-side GNSS receiver 160 or a user-side satellite receiver 160. In particular, the static reference satellite receiver 130, the data processing device 140 and the user-side satellite receiver 160 will be discussed in greater detail with reference to the following figures.

The static reference satellite receiver 130 and the user-side satellite receiver 160 are embodied to receive signals 115, in particular two-frequency GNSS signals 115, from the GNSS satellite 110. Furthermore, the static satellite receiver 130 is embodied to transmit state signals 135 or measurement data of the static reference satellite receiver 130 for network balancing, i.e. for example a parameter estimate including estimating an electron density and quality indicators, to the data processing device 140. The data processing device 140 is embodied to transmit correction data 145 or atmospheric correction parameters 145 to the user-side satellite receiver 160 by means of the transmission station 150 and the geostationary transmission satellite 120.

In other words, in FIG. 1 a signal path from the GNSS satellite 110 to a transmission of the correction data 145 to the user-side satellite receiver 160 is shown. By way of example, in FIG. 1 only one GNSS satellite 110 is shown, wherein however the satellite signals 115 of a plurality of satellites 110 can be measured by the static reference satellite receiver 130 and the user-side satellite receiver 160.

At the GNSS reference stations 130 in the correction data network, in particular the electron density or the so-called total electron content (TEC) for each signal path between satellites and receivers of the respective GNSS reference station 130 is determined using a common method. The TEC values are used as a basis for an ionospheric model by the correction service or correction data provider for the calculation of a global vertical total electron content (VTEC), i.e. a VTEC value can be calculated for each geographic length, geographic width and time, wherein interpolation estimates are used between the GNSS reference stations 130. For example, the use of polynomials, spherical surface functions, kriging interpolations, voxels or B-splines is common. Each of said methods results in particular in smoothing of the data between measurement base points, however. I.e. between measurement points the accuracy of the determined TEC depends on the interpolation method used. It can be assumed from this that the value is most accurate in the region of the individual GNSS reference stations 130.

A region in the high atmosphere extending approximately between 50 kilometers and 1000 kilometers of altitude and transitioning above into the plasmasphere is described as the ionosphere. The ionosphere is characterized by an increased concentration of charged particles that exist as a result of ionization processes depending on the solar radiation. Electromagnetic signals are refracted in the ionosphere depending on the frequency and intensity of the ionization. As a result, signal delays sometimes occur in the observations of global satellite navigation systems, such as for example the GNSS, which must be corrected for positioning and navigation applications. With the use of geodetic two-frequency receivers, although signal combinations can be used in order to eliminate a first-order ionospheric effect, however the ionospheric state should be known in order to obtain very short convergence times for a highly accurate position solution. Single-frequency receivers resort to atmospheric models in order to correct the signals and to achieve accuracies of less than 1 meter. According to exemplary embodiments, as described with reference to the following figures, in particular such an ionospheric effect can be corrected reliably and accurately for positioning and navigation applications, wherein indications regarding the integrity of correction data 145 are also enabled.

As a basis, for example the integrated electron density or the so-called total electron content (TEC) can be used as a correction parameter, because the same can be directly extracted from two-frequency GNSS observations, for example. In addition to other GNSS correction data, such as high-precision satellite track data, satellite clocks, tropospheric corrections or diverse biases, for example ionospheric correction data of so-called GNSS correction services can also be supplied in order to enable a centimeter-accurate position and short convergence times for a GNSS user. GNSS correction services calculate such correction data from regional or global station networks with GNSS receivers or GNSS reference stations 130. Whereas track, clock, tropospheric and bias parameters can be determined reliably based on the characteristics thereof, this is traditionally not the case or is only the case to a limited extent for ionospheric corrections. Because of physical conditions, in view of which a station distribution is inadequate in order to detect ionospheric disturbances at the location of the GNSS user, therefore traditionally no assurances regarding probabilities of error occurrence are provided by correction services. Instead of this, the responsibility for integrity assurance and thereby the detection of erroneous ionospheric corrections lies with the user. This concerns in particular small-scale temporal or spatial, dynamic and irregularly occurring phenomena, such as so-called traveling ionospheric disturbances (TIDs) differentiated as small-scale, medium-scale and large-scale TIDs, sudden ionospheric disturbances (SIDs), spread F-layer, sporadic E-layer, ionospheric storms and scintillations. According to exemplary embodiments however, as described with reference to the following figures, indications regarding the integrity of such correction data 145 may also be enabled.

So-called ROT maps or ROTI maps (ROT=Rate of electron density, rate of TEC; TEC=Total Electron Content, electron density or total electron content–ROTI=rate of change of electron density index; rate of change of TEC index) can be generated, i.e. grid-based ROT values or ROTI values, which reflect ionospheric disturbances, as far as an underlying station distribution allows. Based on wired transmission paths, the transmission and monitoring of the ROTI would be conceivable, wherein for vehicle applications wireless links, such as the broadcast method by means of geostationary transmission satellites 120, are mainly used for transmission in this case and the correction data 145 are transmitted via L-Band. It should be noted here that correction parameters can be transmitted with the quality indicators or QI values thereof for a region that is visible from or covered by the satellite 110. In order to provide efficient data transfer at low bandwidth, in this case for example model coefficients are transmitted, from which the corresponding parameters can be extensively reconstructed.

According to exemplary embodiments, it is described herein that in particular regional monitoring of ROT or ROTI and of QI values and the dynamics thereof in the surroundings of the user may be enabled while taking into account a transmission bandwidth and the costs.

Figure 2:
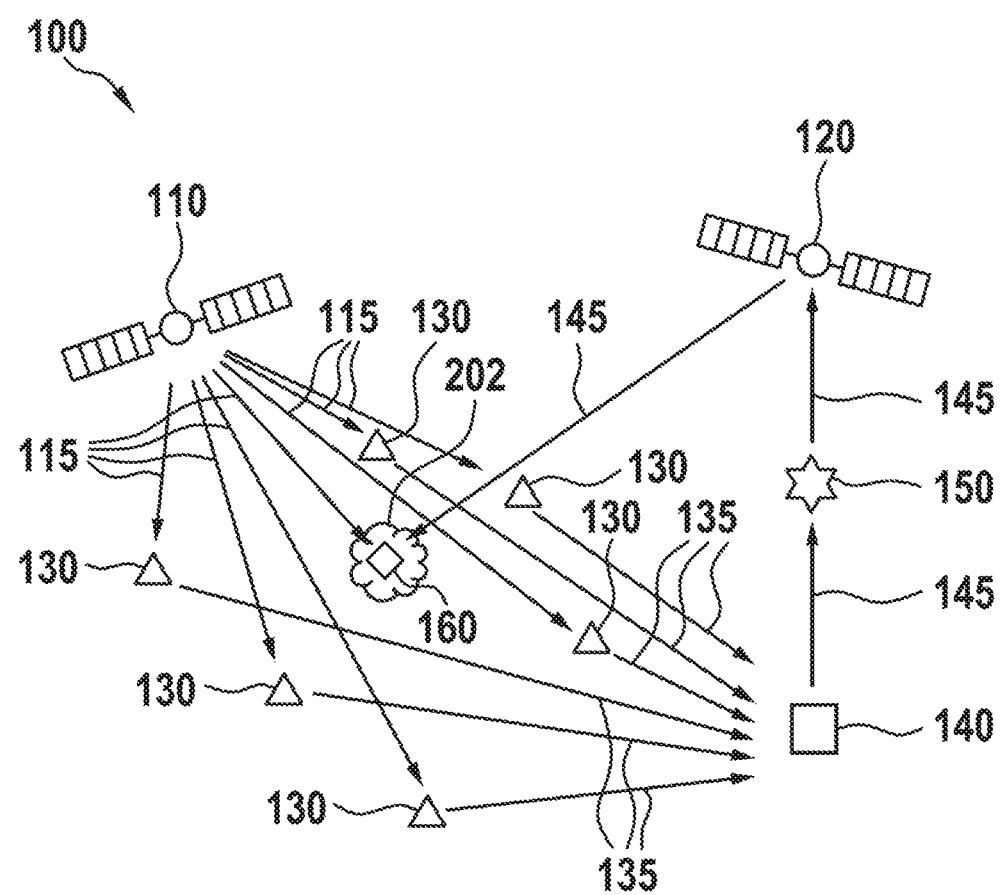
FIG. 2 shows a schematic representation of the satellite navigation system of FIG. 1 in the presence of an atmospheric disturbance.

FIG. 2 shows a schematic representation of the satellite navigation system 100 of FIG. 1 in the presence of an atmospheric disturbance 202. The atmospheric disturbance 202 is located in the region of the user-side satellite receiver 160 and between GNSS reference stations 130. Also, an ionospheric disturbance 202 of this type occurring between GNSS reference stations 130 can be detected according to exemplary embodiments, so that in addition to an interpolated value, information about the potential disturbance 202 can also be provided. Thus, integrity assurance can be simplified and improved. In this case, an error in the satellite signals 115 received by the user-side satellite receiver 160 that is caused by the atmospheric disturbance 202 can be corrected, wherein information about the integrity of the correction data can also be provided. Even if the atmospheric disturbance 202 remains registered at the GNSS reference stations 130, the error effect can be compensated using the correction data 145 and while taking into account the integrity information.

Figure 3:
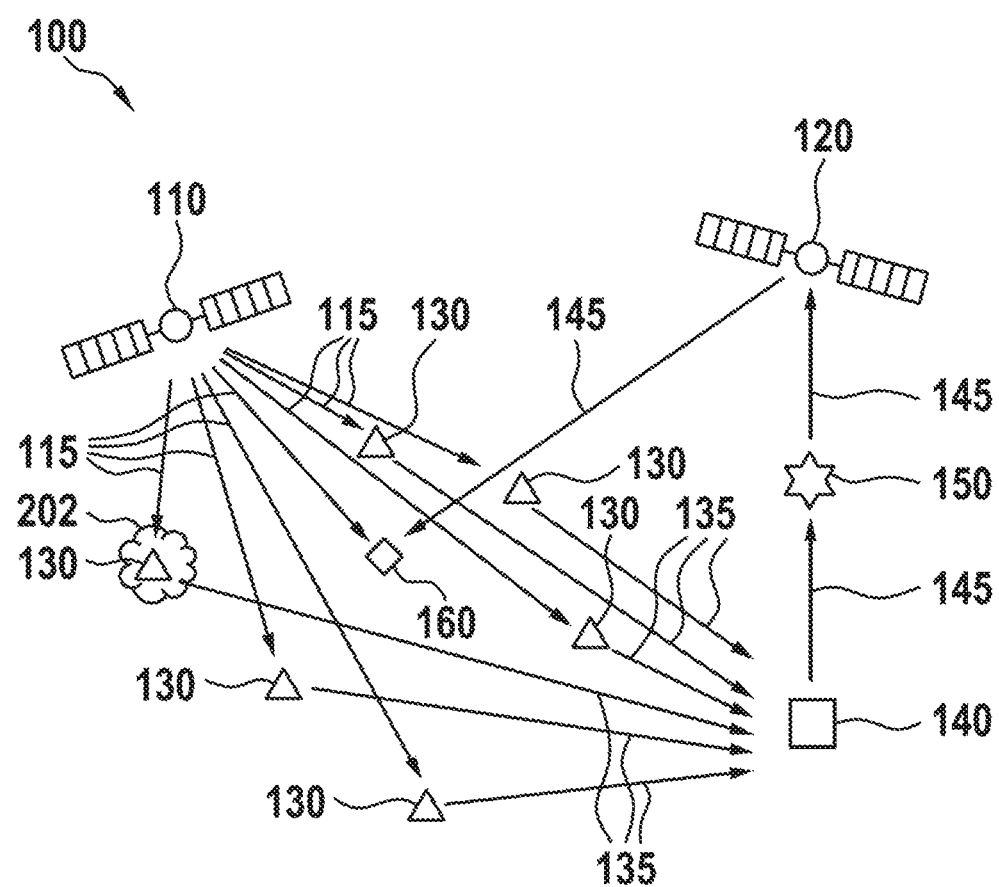
FIG. 3 shows a schematic representation of the satellite navigation system of FIG. 1 or FIG. 2 in the presence of an atmospheric disturbance.

FIG. 3 shows a schematic representation of the satellite navigation system 100 of FIG. 1 or FIG. 2 in the presence of an atmospheric disturbance 202. In this case, the atmospheric disturbance 202 is located in the region of one of the GNSS reference stations 130. Even if an ionospheric disturbance or atmospheric disturbance 202 is located above a GNSS reference station 130 that is contributing to the calculation of the correction data 145, according to exemplary embodiments it may be enabled that indications can be obtained regarding the integrity of the correction data 145. Typically, in particular quality indicators (QI) in the form of standard deviations or variances for individual correction parameters can be transmitted, but a mathematical model underlying the network balancing of the correction service or correction data provider should also reflect the atmospheric disturbance 202 in the variance. Because according to exemplary embodiments integrity indications or reliability indications can be made, the responsibility for the integrity assurance can also be undertaken by a user in this case. In the representation of FIG. 3, only by way of example a GNSS reference station 130 that is contributing to the calculation of the correction data 145 is affected by the atmospheric disturbance 202. The user or the user-side satellite receiver 160 no longer needs to rely on such a disturbance 202 being reflected in a quality indicator provided to the TEC, because more than just the quality indicator, which results from a calculation of surrounding GNSS reference stations 130, is being provided to a user position and this results in increased independence from a model of the correction data provider. Furthermore, the correction data provider can also remove or reduce the weighting of the GNSS reference station 130 that is affected by the atmospheric disturbance 202 from or in the compensation after detecting the disturbance 202.

Figure 4:
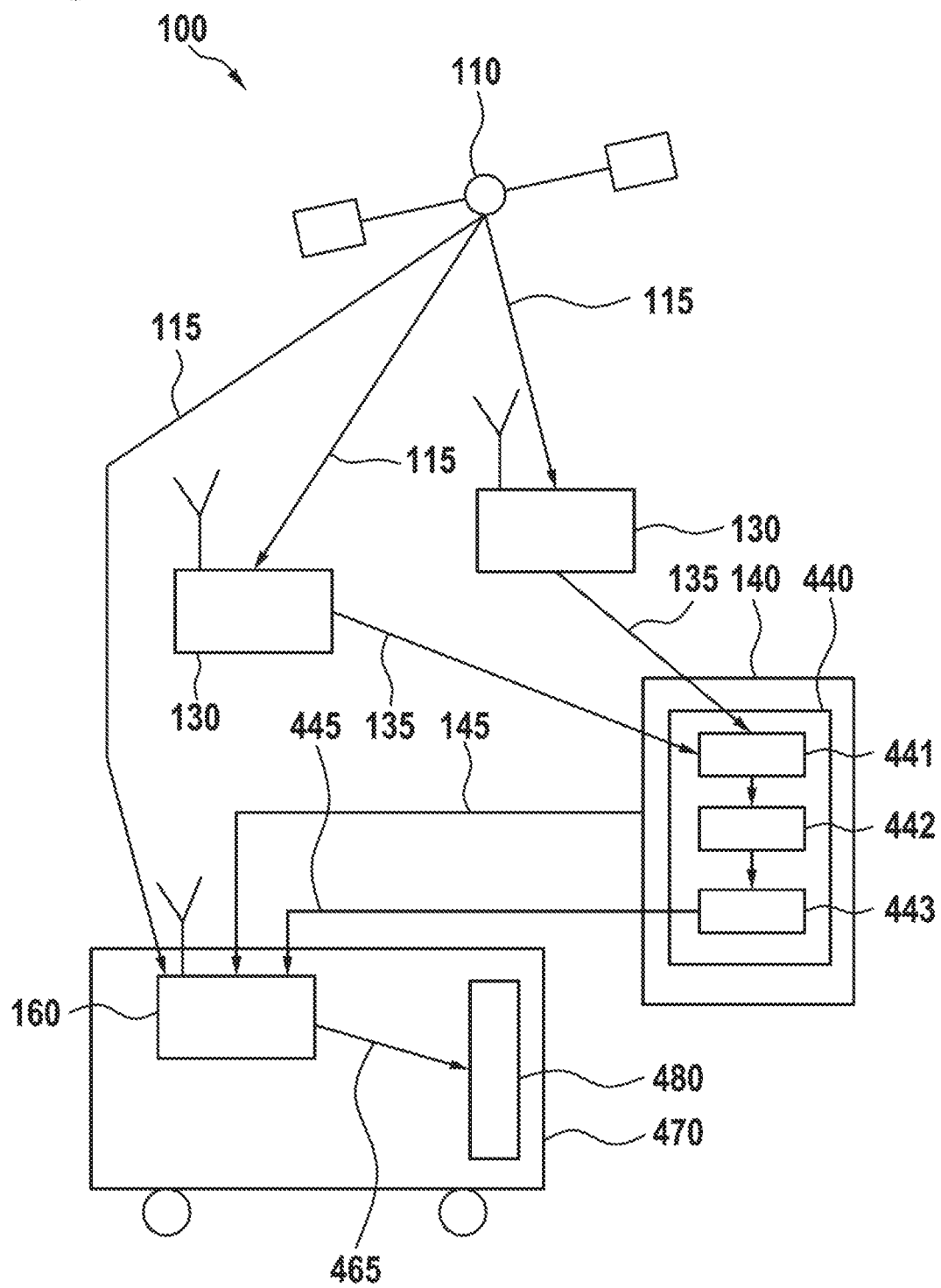
FIG. 4 shows a schematic representation of a satellite navigation system with an apparatus according to an exemplary embodiment.

FIG. 4 shows a schematic representation of a satellite navigation system 100 with an apparatus 440 according to an exemplary embodiment. In this case, the satellite navigation system 100 corresponds to or is similar to the satellite navigation system from one of the figures described above. In this case, the satellite 110, by way of example only two of the static satellite receivers 130, the data processing device 140, the satellite receiver 160 or user-side satellite receiver 160 and the apparatus 440 from the satellite navigation system 100 in the representation of FIG. 4 are shown.

The static satellite receivers 130 are embodied to receive the satellite signals 115 from the satellites 110. The data processing device 140 is embodied to receive the state signals 135 from the static satellite receiver 130. The user-side satellite receiver 160 is disposed in a vehicle 470. The user-side satellite receiver 160 is embodied to receive the atmospheric correction parameters 145 for the correction of atmospheric disturbances during satellite navigation of the vehicle 470 from the data processing device 140. The satellite receiver 160 of the vehicle 470 is also embodied to receive satellite signals 115 from the satellite 110. Thus, on the user side ROT, ROTI or ROQ information can be determined in order to obtain an estimate of a current atmospheric or ionospheric activity and/or to check the plausibility of incoming correction data for atmospheric errors or ionospheric errors. ROQ stands for rate of quality in this case and will be described in detail further below in connection with FIG. 6.

According to the exemplary embodiment represented in FIG. 4, the apparatus 440 is implemented as a part of the data processing device 140. The apparatus 440 is embodied to provide integrity information 445 for checking the atmospheric correction parameters 135 for the correction of atmospheric disturbances for satellite navigation for the vehicle 470. For this purpose, the apparatus 440 comprises a reader 441 and a determining device 442.

The reader 441 is embodied to read the state signals 135 from the static satellite receiver 130. The state signals 135 are signals relating to a state of the atmosphere between the satellite receiver 130 and the satellite 110. Each state signal 135 represents certain state data that is dependent on a state of the atmosphere between a satellite 110 and a static satellite receiver 130 using at least one satellite signal 115 transmitted between the satellite 110 and the static satellite receiver 130.

The determining device 442 is embodied to determine the integrity information 445 using the state data of the state signals 135 read by means of the reader 441. In this case, the determining device 442 is embodied to analyze a variation of the state data against time.

According to one exemplary embodiment, the reader 441 is embodied to read state signals 135, the state data of which represent a total electron content as a parameter of the Earth's atmosphere and/or quality indicators of at least one satellite receiver 130. The total electron content is defined for this as the product of electron density and distance, measured in electrons per square meter. The quality indicators have standard deviations and/or variances relating to a signal transmission by means of the at least one satellite receiver. In this case, the determining device 442 is embodied to determine a gradient of the total electron content over a specified time interval, a standard deviation of a gradient of the total electron content over a specified time interval and/or a change against time of the quality indicators over a specified time interval as integrity information 445.

According to the exemplary embodiment represented in FIG. 4, the determining device 442 is implemented as a determining device outside the vehicle 442. Alternatively, the determining device 442 can also be implemented as a part of at least one static reference satellite receiver 130.

According to one exemplary embodiment, the reader 441 is embodied to read position information of the static reference satellite receiver 130 as the source of the state signals 135, in particular together with the state signals 135.

In this case, the determining device 442 is embodied to determine the integrity information 445 using the position information.

According to the exemplary embodiment represented in FIG. 4, the apparatus 440 also comprises a transmitter 443 for transmitting the integrity information 445 that is determined by means of the determining device 442 to the satellite receiver 160 of the vehicle 470. Optionally, the transmitter 443 is embodied to transmit the integrity information 445 according to a result of a threshold value decision. For the threshold value decision, a comparison of the state signals 135 or the integrity information 445 with a threshold value that is related to the atmospheric disturbances is carried out. Furthermore, the transmitter 443 is optionally embodied to transmit integrity information 445 based on the state signals 135 of selected static reference satellite receivers 130. The selected static reference satellite receivers 130 are selected in particular depending on a geographic position of the satellite receiver 160 of the vehicle 470.

The satellite receiver 160 of the vehicle 470 is embodied to check the atmospheric correction parameters 145 using the integrity information 445 that is provided by means of the apparatus 440 in order to produce atmospheric correction parameters that have been checked for integrity. Thus, the user-side satellite receiver 160 can be embodied to determine an own position of the user-side satellite receiver 160 or the vehicle 470 using the checked atmospheric correction parameters 145.

According to the exemplary embodiment represented in FIG. 4, the user-side satellite receiver 160 is further embodied to provide an output signal 465 that represents the determined own position for output to a further vehicle device 480.

Figure 5:
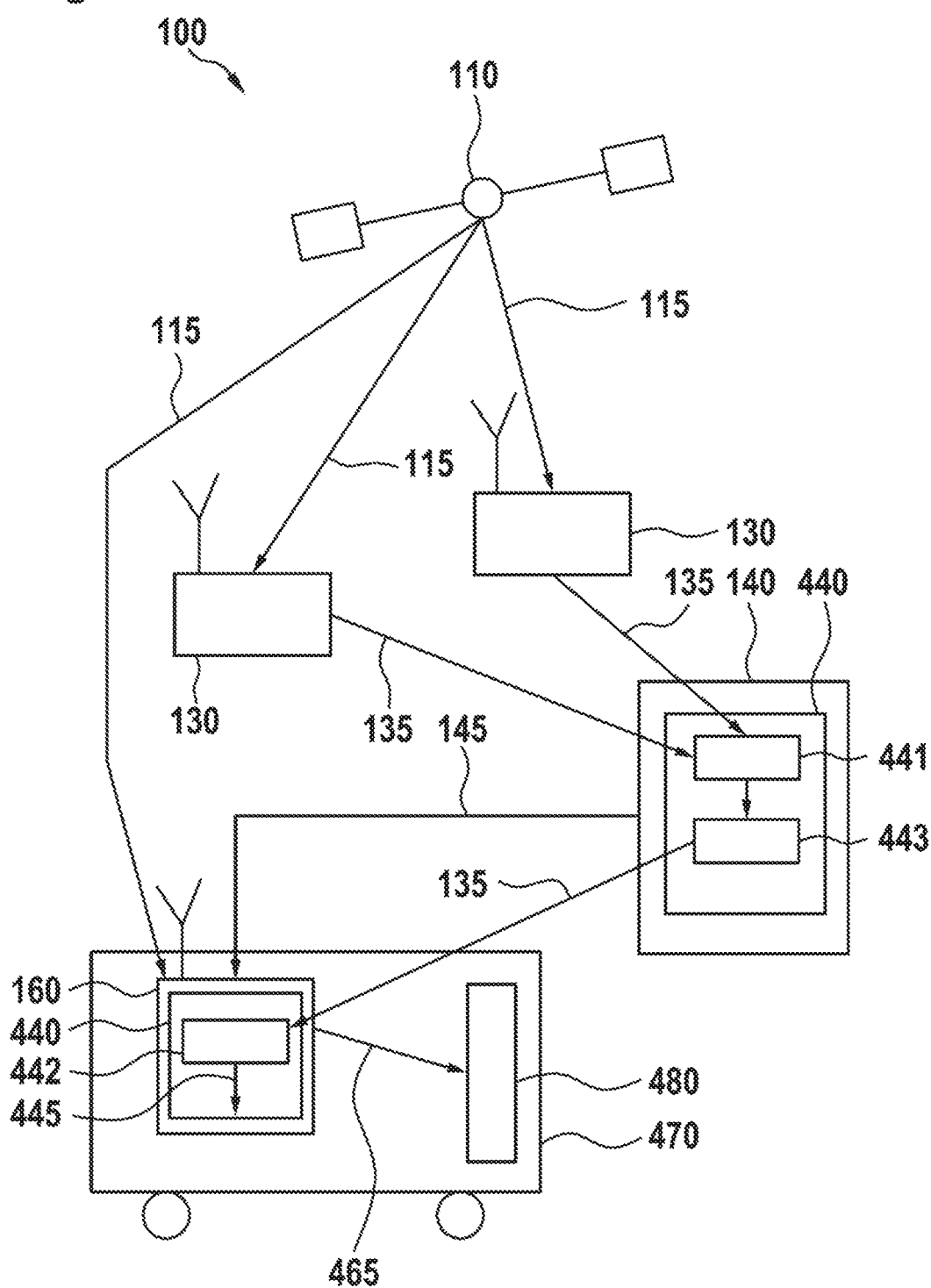
FIG. 5 shows a schematic representation of a satellite navigation system with an apparatus according to an exemplary embodiment.

FIG. 5 shows a schematic representation of a satellite navigation system 100 with an apparatus 440 according to an exemplary embodiment. In this case, the satellite navigation system 100 corresponds to the satellite navigation system of FIG. 4 with the exception that the determining device 442 of the apparatus 440 is implemented as a part of the user-side satellite receiver 160 or the satellite receiver 160 of the vehicle 470. Thus, the apparatus 440 is implemented as divided or distributed between the data processing device 140 and the user-side satellite receiver 160. In this case, the transmitter 443 is embodied to transmit the state signals 135 to the user-side satellite receiver 160, or stated more accurately to the determining device 442. According to one exemplary embodiment, the transmitter 443 is embodied to transmit state signals 135 of selected static reference satellite receivers 130. The determining device 442 is embodied to release the integrity information 445 for use by the user-side satellite receiver 160.

FIG. 6 shows a flow chart of a providing method 600 according to an exemplary embodiment. The method 600 can be implemented in order to provide integrity information for checking atmospheric correction parameters for the correction of atmospheric disturbances for satellite navigation for a vehicle. In this case, the method 600 can be implemented to provide by means of an apparatus from one of the figures described above.

In a reading step 610, state signals that are to be provided with the method 600 and that are related to a state of the atmosphere between at least one satellite receiver and at least one satellite of the at least one satellite receiver are read. Each state signal represents certain state data that are dependent on a state of the atmosphere between a satellite and a satellite receiver using at least one satellite signal that is transmitted between the satellite and the satellite receiver.

Subsequently, the integrity information is determined using the state data in a determination step 620. In this case, a variation of the state data against time is analyzed.

According to an exemplary embodiment, the determination step 610 is implemented by means of at least one static reference satellite receiver, by means of a determining device that is external to the vehicle and/or by means of a satellite receiver of the vehicle.

According to a further exemplary embodiment, the providing method 600 also comprises a transmission step 630. In the transmission step 630, the state signals or the integrity information is or are transmitted to a satellite receiver of the vehicle. The transmission step 630 can be carried out before or after the determination step 620.

With reference to the figures described above, in particular the FIGS. 4 to 6, exemplary embodiments and advantages of exemplary embodiments are again briefly described and/or presented below, in other words in a summary.

First, the integrity monitoring based on ROT or ROTI by means of the apparatus 440 will be discussed.

It can be assumed from this that interpolation errors of the TEC vertically above the static reference satellite receiver 130 are small because typically a plurality of satellites 110 that provide information for determining the TEC can be observed simultaneously in the immediate surroundings. It is therefore proposed to determine the rate of the TEC (ROT) at the positions of the static reference satellite receiver 130 as a quotient $$ROT = \frac{\Delta VTEC}{\Delta t} = \frac{\Phi_{GF}(i) - \Phi_{GF}(i-1)}{\Delta t \cdot 10^{16} \cdot 40.3 \cdot \left(\frac{1}{f_1^2} - \frac{1}{f_2^2}\right)} \quad \text{(Equation 1)}$$

wherein $\Delta VTEC$ is the TEC gradient against time at the zenith or the vertical TEC and $\Delta t$ is the sampling against time. Furthermore, in this case $\Phi_{GF}$ stands for a geometry-free linear combination of two-frequency phase measurements at frequencies $f_1$ and $f_2$. The use of an oblique TEC (STEC) between the static reference satellite receiver 130 and the satellite 110 is ignored here because spatial TEC variations (due to satellite movement) and temporal TEC variations would otherwise mix together in the calculation of the ROT and would provide the ROT satellite-specifically. It should be noted that calculations of the VTEC or STEC are based on common methods and are therefore not described in detail.

In general, ROT thus represents a TEC gradient against time for a given time interval and is used as a basis for the calculation of ROTI:

$$ROTI = \sqrt{\frac{1}{N} \sum_{j=i-N}^{i} (ROT(j) - \overline{ROT})^2} \quad \text{(Equation 2)}$$

ROTI is defined as the standard deviation of ROT over a time interval or over a defined base number N. With ROT and ROTI there are two measures for the detection of ionospheric or atmospheric disturbances 202. Depending on a measurement frequency of the respective GNSS receiver 130 or static reference satellite receiver 130, scintillations can thus also be detected that can normally only be detected by high-cost scintillation receivers in conventional geodetic applications. In the course of developments for highly automated driving, for which high measurement frequencies and high accuracies using expensive sensors are required, for example with regard to motorway travel, it is thus conceivable that even inexpensive satellite receivers 130 or 160 could be used. Proposed interval lengths for the high-resolution temporal detection of ionospheric or atmospheric 202 disturbances are for example time steps of 1/30 s for the calculation of ROT and 5 minute time window lengths for determining ROTI.

According to the exemplary embodiment represented in FIG. 4, the transmitter 443 is embodied to transmit the ROT values or ROTI values for the individual static reference satellite receivers 130 with a station identification to the user-side satellite receiver 160 as integrity information 445. In order to save bandwidth and hence costs, variants in this regard are conceivable, wherein for example: only data of individual selected stationary reference satellite receivers 130 are transmitted; a plurality of stationary reference satellite receivers 130 is used for the calculation of a region-dependent ROT or ROTI, with prior identification of such areas, so that an assignment can be carried out; only ROTI indices that exceed a defined threshold value are transmitted. This results in reduced computing power for the user-side satellite receiver 160 by calculating the ROT or ROTI in the data processing device 140.

According to the exemplary embodiment represented in FIG. 5, the integrity information 445 is determined in the user-side satellite receiver 160, wherein ROT or ROTI at the positions of the static reference satellite receiver 130 of the correction service are determined using the transmitted TEC values as state data. Thus, transmission bandwidth can be saved. In order to minimize calculation costs in the user-side satellite receiver 160, in addition a choice of nearby static reference satellite receivers 130 can be made and ROT or ROTI can be calculated only for said selected reference satellite receivers.

In both cases, ROT values or ROTI values for station positions of the correction networks are thus available as integrity information 445 for the user-side satellite receiver 160, being at least representative of the surroundings of a geographic position of the user-side satellite receiver 160, i.e. in both cases position information or station coordinates of the static reference satellite receivers 130 can therefore be provided. In particular, individual stationary reference satellite receivers 130 can thus be evaluated in the surroundings of the user-side satellite receiver 160 in order to determine whether discrepancies indicate local disturbances in the surroundings. The occurrence of increased ROT values or ROTI values can imply ionospheric or atmospheric disturbances 202, which could possibly result in erroneous correction data or atmospheric correction parameters 145.

As a further measure, in the case of a two-frequency GNSS receiver as the user-side satellite receiver 160 it is possible to determine ROT or ROTI for the own position thereof without using correction data or atmospheric correction parameters 145 and comparing with values of the correction service arising from the surroundings. In this case, the VTEC at the geographic position of the user-side satellite receiver 160 can be derived from STEC measurements for a plurality of satellites 110. The following optional measures are proposed: ROT or ROTI should be derived from measurements on satellites 110 at higher elevation or close to the zenith in order to minimize error influences by means of near-horizon measurements. In principle, the ΔTEC is also determined here at satellites 110 in the surroundings of the user-side satellite receiver 160, i.e. an interpolation, for example a polynomial interpolation, can be carried out on the user side, by which the ΔVTEC can be determined at a geographic position of the user-side satellite receiver 160. Discrepancies between ROT or ROTI of the correction service or correction data provider and the self-determined integrity information 445 can imply that either there is a local ionospheric or atmospheric disturbance 202 in the area of the user-side satellite receiver 160 that is unrecognized by the correction service, for example a scintillation, or there is an atmospheric disturbance 202 at a static reference satellite receiver 130 that may reach the user-side satellite receiver 160 in the future, for example travelling ionospheric disturbances (TID). The latter can indicate that the correction data or atmospheric correction parameters 145 may already be corrupted.

The integrity monitoring by means of the apparatus 440 based on TEC quality indicators will now be discussed.

In contrast to ROT parameters or ROTI parameters, which can be used for the detection of receiver-specific disturbances, quality indicators (QI), typically standard deviations or variances that result from network balancing in the correction network and that are output together with the atmospheric correction parameters 145 or the TEC corrections, can be used in addition or alternatively for integrity monitoring. On the one hand, QI values can be used directly for this and on the other hand a change of the QI values at the static reference satellite receivers 130 (similarly to for ROT) can be monitored. Said parameter based on the change is referred to below as ROQ (Rate of Quality). The QI are not directly receiver-specific but are dependent on the network balancing and an underlying mathematical model. The standard deviations or variances that result from the network balancing and that are contained in a covariance matrix are often used as QI. For the case in which the QI is transmitted as the standard deviation, the following relationship results for example, similarly to for ROT:

$$ROQ = \frac{\Delta \sigma_{VTEC}}{\Delta t}, \qquad \text{(Equation 3)}$$

wherein $\Delta \sigma_{VTEC}$ represents a change against time of the standard deviation that is determined from the network of the correction service or the correction data provider over the time window $\Delta t$. It is proposed to use the methods described for ROT or ROTI for quality indicators or ROQ. There are therefore the following corresponding cases:

According to the exemplary embodiment represented in FIG. 4, the transmitter 443 is embodied to transmit the QI or ROQ for the individual static reference satellite receivers 130 with a station identification as integrity information 445 to the user-side satellite receiver 160. Variants or measures for using selected stations, region-dependent quality indicators and the transmission of quality indicators exceeding a threshold value, as previously described for ROT or ROTI, can also be implemented.

According to the exemplary embodiment represented in FIG. 5, the quality indicators at the positions of the static reference satellite receivers 130 of the correction service are interrogated by the user-side satellite receiver 160 and the integrity information 445 is determined in the form of the ROQ in the user-side satellite receiver 160, because the quality indicators, such as the TEC, are transmitted extensively by the correction service.

ROQ represents uncertainties in the determination of the correction data or atmospheric correction parameters 145, so that in this case deficiencies in the determination of the atmospheric correction parameters 145 because of ionospheric or atmospheric disturbances 202 at the individual static reference satellite receivers 130 can be revealed. This indication expands ROTI for a static reference satellite receiver 130 in the sense that the TEC gradients, which actually turn out to be small owing to smoothing in an interpolation or by down-weighting a disturbed static reference satellite receiver 130 in the adjustment and do not result in suspect ROTI values, in which ROQ values can be revealed, because ionospheric or atmospheric disturbances 202 are reflected in larger uncertainties of parameter estimation, i.e. larger standard deviations.

Furthermore, it is also possible to calculate the ROQ for the geographic position of the user-side satellite receiver 160 so that here too there is a possibility of checking the plausibility of uncertainties. However, it should be noted that in contrast to ROT, ROQ at the position of the user-side satellite receiver 160 can only be determined from the atmospheric correction parameters 145, because there is no parameter estimation of the TEC here or no measurement redundancy for such a compensation and hence there are normally no specially calculated quality indicators.

If an exemplary embodiment comprises an "and/or" connection between a first feature and a second feature, then this is to be read as that the exemplary embodiment comprises both the first feature and the second feature according to one embodiment and comprises either only the first feature or only the second feature according to a further embodiment.

What is claimed is:

1. A method for providing integrity information for checking atmospheric correction parameters for the correction of atmospheric disturbances for satellite navigation for a vehicle, the method comprising:
    reading state signals, relating to a state of an atmosphere between at least one satellite receiver and at least one satellite, using the at least one satellite receiver, wherein each state signal represents certain state data that are transmitted between the at least one satellite and the at least one satellite receiver using at least one satellite signal, and that are dependent on a state of the atmosphere between the at least one satellite and the at least one satellite receiver; and
    determining the integrity information, wherein the integrity information is based upon a variation of the state data over a predetermined period of time.

2. The method according to claim 1, further comprising:
    determining the integrity information using at least one of at least one static reference satellite receiver and a determining device that is external to the vehicle, and a satellite receiver of the vehicle.

3. The method according to claim 1, wherein the at least one satellite receiver is a static reference receiver, the method further comprising:
    using position information to determine the integrity information of the static reference satellite receiver.

4. The method according to claim 1, wherein the at least one satellite receiver is a satellite receiver of a vehicle, the method further comprising:
    transmitting at least one of the state signals and the integrity information to the satellite receiver of the vehicle.

5. The method according to claim 4, further comprising:
    using a result of a threshold value decision to implement the transmission of the state signals,
    wherein a comparison of the state signals or the integrity information with a threshold value related to the atmospheric disturbances is carried out when making the threshold value decision.

6. The method according to claim 5, further comprising:
    transmitting at least one of the state signals of selected static reference satellite receivers, and the integrity information based on the state signals of the selected static reference satellite receivers,
    wherein the selected static reference satellite receivers are selected depending on a geographic position of the satellite receiver of the vehicle.

7. The method according to claim 1, wherein:
    the state data represents at least one of a total electron content as a parameter of Earth's atmosphere, and quality indicators of the at least one satellite receiver; and
    determining the integrity information includes at least one of determining a gradient of the total electron content over a specified time interval, determining a standard deviation of a gradient of the total electron content over a specified time interval, and determining a change against time of the quality indicators over a specified time interval,
    wherein the total electron content is defined as a product of electron density and distance, measured in electrons per square meter, and
    wherein the quality indicators include at least one of standard deviations, and variances relating to a signal transmission using the at least one satellite receiver.

8. The method according to claim 1, wherein an apparatus is configured to at least one of carry out, and actuate steps of the method in corresponding units.

9. The method according to claim 1, wherein a computer program is configured to at least one of carry out, and actuate the method.

10. The method according to claim 9, wherein the computer program is stored on a non-transitory machine-readable memory medium.

* * * * *